Feb. 18, 1941.     L. M. DE TURK     2,232,101
POWER TRANSMISSION MECHANISM
Filed May 18, 1937     2 Sheets-Sheet 1
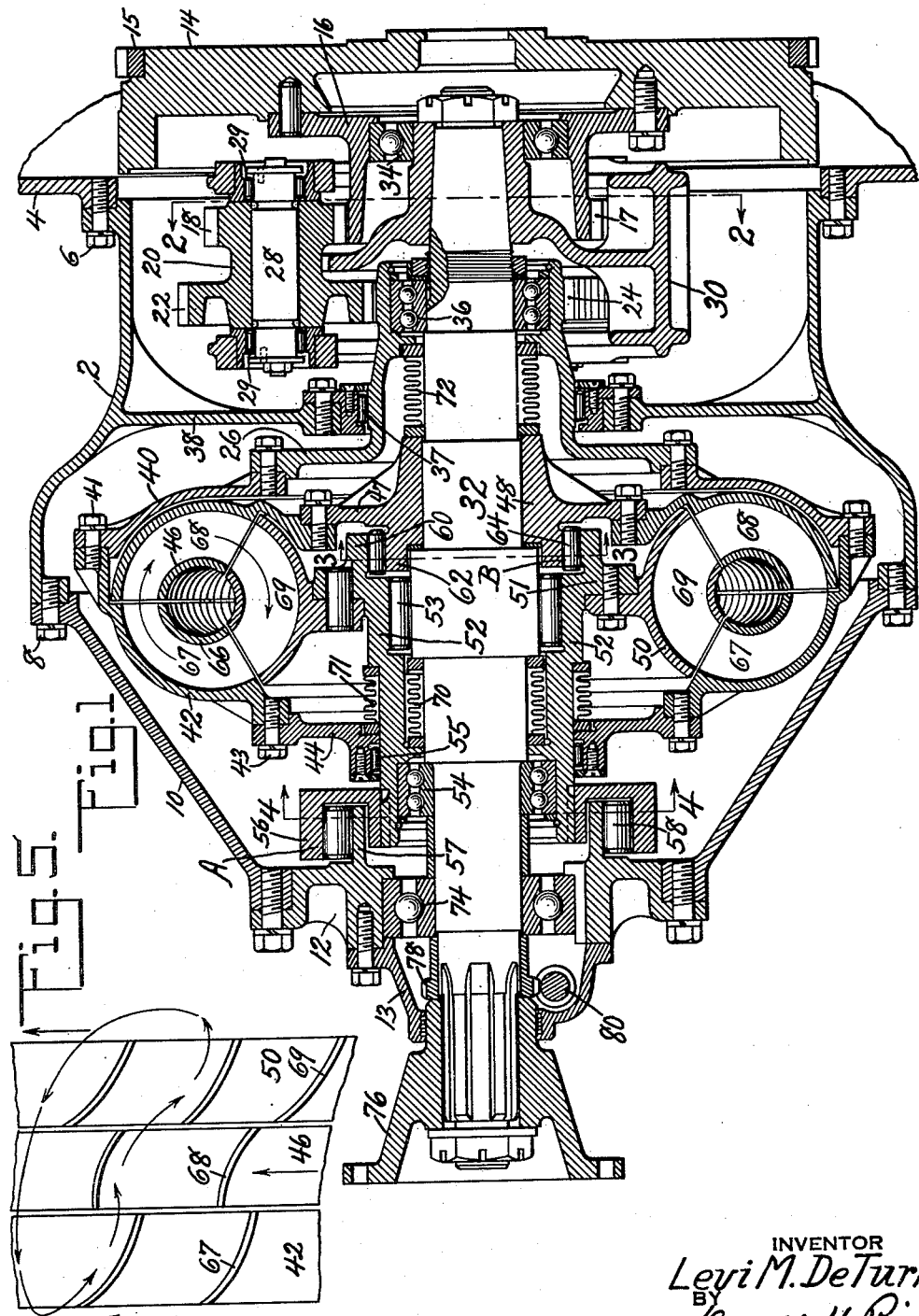
INVENTOR
Levi M. DeTurk
BY
ATTORNEY Feb. 18, 1941.  L. M. DE TURK  2,232,101
POWER TRANSMISSION MECHANISM
Filed May 18, 1937  2 Sheets-Sheet 2
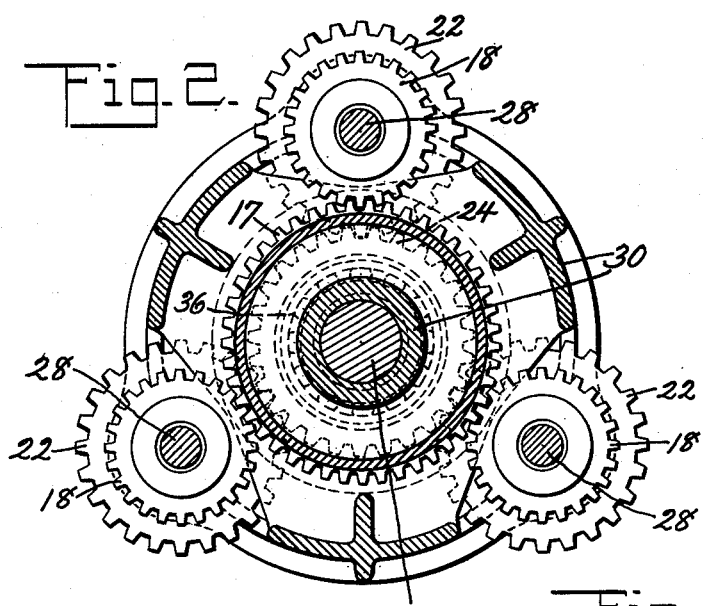
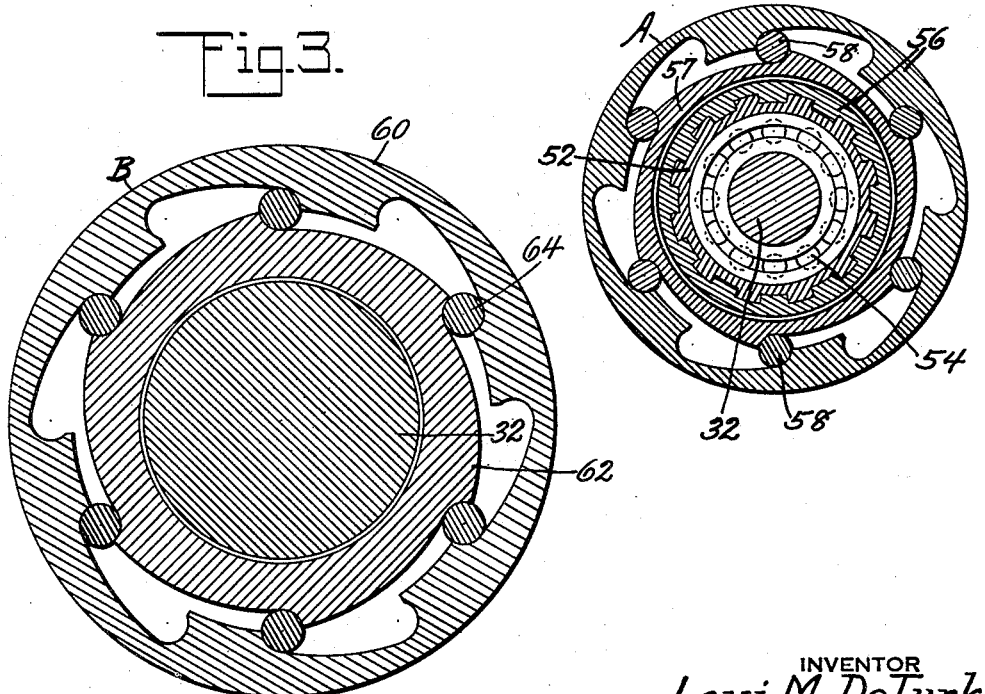
INVENTOR
Levi M. DeTurk
BY
ATTORNEY Patented Feb. 18, 1941

2,232,101

UNITED STATES PATENT OFFICE 2,232,101

POWER TRANSMISSION MECHANISM

Levi M. De Turk, Drexel Hill, Pa., assignor to American Car and Foundry Motors Company, New York, N. Y., a corporation of Delaware Application May 18, 1937, Serial No. 143,251

14 Claims. (Cl. 74—189.5)

This invention relates to hydraulic power transmitting mechanisms of the type embodying gearing and is particularly directed to such mechanism for use on road or rail vehicles.

One object of the invention is the provision of a power transmission mechanism using a fluid turbine and gearing so arranged that the reaction forces in the gears are in such a direction as to be transmitted directly to the driven shaft, thus increasing efficiency.

Another object of the invention is the provision of a power transmission mechanism in which gearing is arranged to drive the impeller unit of the turbine at a comparatively high speed thus permitting the use of a smaller turbine for transmission of a given horse power.

A further object of the invention is the provision of a power transmission mechanism using a fluid turbine and gearing and in which the turbine reaction member may rotate in the same direction as the other members of the turbine, thus decreasing the internal friction and increasing the overall efficiency.

A still further object of the invention is the provision of a power transmission mechanism using a fluid turbine, gearing and an automatic clutch and an automatic brake so arranged that the turbine reaction member may be held either stationary or may be locked to the driven shaft.

These and other objects of the invention will be apparent to persons skilled in the art from a study of the following description and accompanying drawings in which:

Figure 1 is a sectional view taken substantially through the center line of the mechanism;

Fig. 2 is a sectional view taken on line 2—2 of Fig. 1 and showing the relation of the gearing;

Fig. 3 is an enlarged sectional view taken on line 3—3 of Fig. 1 and showing the automatic clutch for securing the reaction member to the driven shafts:

Fig. 4 is a sectional view taken substantially on line 4—4 of Fig. 1 and showing the automatic brake by means of which the reaction member is held stationary with respect to the casing, and Fig. 5 is a diagrammatic view showing one possible relationship between the turbine elements.

Referring now to the drawings in detail it will be seen that the mechanism has been constructed primarily for automobile use and in practice is but slightly larger than the conventional transmission mechanism now used. The mechanism consists of a multi-part housing or casing having an inner portion 2 secured at its forward end to the engine or other framing member 4 by means of bolts 6. The rear edge of this inner portion has secured thereto by bolts 8 an outer housing portion 10 and to this is attached a heavy end casing portion 12 which in turn carries a suitable sealing cap 13. The engine fly-wheel is indicated as at 14 and may be formed as is usual with the starter gear 15. To the fly-wheel is attached a driving gear 16 having gear teeth 17 meshing with gear teeth 18 of spider pinions 20. The spider pinions are formed with a second gear portion having teeth 22 adapted to mesh with teeth 24 formed on hub of turbine connecting member 26. The spider gears are mounted upon shafts 28, the ends of which are carried by means of roller bearings 29 located in spaced openings of spider casting 30. The central portion of this spider casting is shaped to fit the inner end of driven shaft 32 to which it is keyed or otherwise secured. The central portion of the spider casting is machined to provide a bearing for ball unit 34 which engages within the driving gear 16, thus supporting and centering the driven shaft within the driving gear adjacent the fly-wheel. The driven shaft is provided inward of the spider casting with a bearing 36 located beneath the gear of the turbine connecting member which is in turn carried by rollers 37 supported by web 38 formed on the inner portion of the housing or casing. It is thus seen that the turbine connecting member is rotatably supported by the housing and that this member and the driven shaft mutually support each other at the bearings 36.

The outer rim of the turbine connecting member has secured thereto an annular member 40 to which in turn is secured by means 41 the annular shaped impeller member 42 of the turbine. Thus the impeller is operatively connected to the driving member 14 through the medium of gears 20, turbine connecting member 26 and annular member 40. In order to additionally support the impeller member and complete the turbine housing a closure member 44 is secured thereto by means such as bolts 43. Located within the turbine housing and adjacent the impeller is the runner member 46 which is carried by flanges 47 of driven shaft member 48 which is keyed or otherwise secured to the driven shaft. A third or reaction member 50 is located between the runner and impeller elements and is carried by flanges 51 of reaction hub 52 rotatably carried upon the driven shaft by means of roller bearing 53 and ball bearing 54. The reaction hub is formed with a portion providing support for the rollers 55 which in turn support the closure member 44 previously referred to.

The reaction hub has keyed thereto at one end portion the annular member 56 forming the outer element of the automatic brake A. The inner member of the brake is formed by a projection 57 formed on the end casing portion (Figs. 1 and 4). The inner and outer members of this automatic brake are formed in the conventional manner as shown in Fig. 4 to receive rollers 58 which will permit rotation of the reaction hub in a clockwise direction as viewed from the flywheel end of the mechanism, while preventing rotation thereof in a counterclockwise direction. The opposite end of the reaction hub is formed with a projection providing the outer element 60 of automatic clutch B. The inner element of this clutch is formed by projection 62 provided on the driven shaft member 48 previously referred to. The inner and outer elements of this clutch are formed to accommodate the clutch rollers 64 and are shaped to prevent rotation of the reaction hub in a clockwise direction relative to the runner member as viewed from the flywheel end of the mechanism while permitting rotation in the opposite direction. It is thus seen that brake A will prevent rotation of the reaction member in one direction relative to the casing, while the clutch B will prevent the reaction member from rotating in the opposite direction at a rate faster than the rate of travel of the runner member.

Each of the turbine elements are formed with inwardly projecting blades having their inner edges secured to curved members 66 which, in the assembled position of the turbine, will form an unobstructed annular ring or pipe-like structure at the center of the turbine about which the fluid may circulate as indicated in Figure 1. The blades 67 of the impeller may be curved in one direction as indicated in Fig. 5, thus driving the fluid against the oppositely curved blades 68 of the runner which in turn reject the fluid to the slightly curved blades 69 of the reaction member and these blades return the fluid to the impeller blades thus completing the circuit around the central opening. It is obvious that the curvature of the blades as indicated in this Fig. 5 is merely representative to indicate the flow of material.

The turbine is sealed by flexible seal members 70, 71 and 72 of conventional design. These members are located respectively between the driven shaft and reaction hub, between the reaction hub and turbine closure member 44 and between the driven shaft and turbine connecting member, thus effectively sealing all points at which fluid might escape from the turbine, but it is to be noted that even though a slight amount of fluid should escape from the turbine it would still be retained within the casing or housing of the transmission.

The rear portion of the driven shaft is supported in the transmission housing by ball bearings 74 and is extended beyond the bearing for splined connection to the member 76 which may form part of the customary universal joint. The rear portion of the driven shaft is also shown as provided with speedometer gear 78 meshing with worm 80 which would be in turn connected to the speedometer or other speed indicating means.

The operation of the mechanism will be as follows with all directions of rotation indicated as they would be if viewed from the engine or flywheel end of the transmission: With the flywheel rotating in a clockwise direction the spider gears will rotate in a counter-clockwise direction, thus rotating the impeller element of the turbine in the same direction as the flywheel but at an increased speed, since the spider gears are arranged to increase the velocity. Rotation of the impeller in a clockwise direction will cause rotation of the turbine fluid in the direction indicated in Fig. 1 and due to the blade design will cause the runner element to rotate in the same direction and since the runner element is fixed to the driven shaft it likewise must rotate in a clockwise direction. With the flywheel rotating at a relatively high rate of speed and the driven shaft substantially stationary, a high torque multiplication will be attained with the torque divided more or less equally between the turbine and the gearing dependent upon the choice of the spider pinion. It is to be noted that since the spider which carries the spider gears is secured to the driven shaft and that since the driven shaft and driving shaft rotate in the same direction, the gear reactions will be in such a direction as to assist at all times, thus increasing the efficiency of the unit. With the flywheel and driven shafts rotating as mentioned above, the turbine fluid will be rotating under considerable pressure and the reaction blades will be urged in a counter-clockwise direction, but are held from rotation due to the automatic brake A. Under these conditions a maximum torque is being delivered to the driven shaft.

Assuming the engine speed to remain constant while the driven shaft speed increases, it is obvious that the spider speed and runner speed will increase since they are secured to the driven shaft and that the runner speed will more nearly approach the speed of the impeller. As the runner speed approaches more nearly to the speed of the impeller, the pressure of the fluid rejected to the reaction member decreases and finally at a certain relative speed, dependent upon the blade design, this pressure will reverse causing the reaction member to rotate in the same direction as the runner. Under such conditions the internal friction of the turbine will be reduced to practically zero and the runner and impeller elements will be practically stationary with respect to each other, the only relative speed being that necessary to maintain the slight reaction necessary to transmit the turbine's share of the power. It should be noted particularly that at all speeds the frictional drag and gear reaction will always be in the same direction in which power is being transmitted and, therefore, will not be entirely lost but will assist in increasing the overall efficiency of the unit; likewise permitting the rotation of the reaction member under certain speed conditions will increase the efficiency of the turbine, also increasing the overall efficiency of the unit.

If the unit has been operated at such a speed as to have the impeller, runner and reaction members rotating in the same direction at substantially the same speed and a sudden load be applied to the driven shaft, the reaction member and spider will be rapidly slowed down, while the gearing and impeller unit will be speeded up, thus increasing the torque transmitted to the driven shaft. Upon slowing down of the runner unit and speeding up of the impeller element, the reaction member will, of course, assume its first position in which it is stationary with respect to the casing. It is thus seen that the transmission will automatically deliver the torque necessary to overcome the load applied to the driven shaft and that an infinite torque multiplication is obtainable dependent only upon the strength of the materials in the unit.

The unit has been described as capable of delivering power in only one direction of rotation, but it is obvious that various reversing mechanisms may be either connected thereto or formed integral therewith to obtain reversal of the driven shaft. These reversing elements may be in the form of gearing or gearing combined with a dental coupling. While the mechanism has been described more or less in detail, it is obvious that various modifications, rearrangements and minor improvements will suggest themselves to persons skilled in the art and all such modifications, rearrangements and minor improvements are contemplated as fall within the scope of the following claims.

What is claimed is:

1. In a power transmission mechanism of the gear and fluid turbine type, a fluid impeller rotor, a fluid runner rotor, a reaction rotor for directing circulating fluid from the runner rotor back to the impeller rotor, a driving member, gearing connecting said driving member and impeller rotor, a driven shaft connected to the runner rotor and an element of the gearing for joint propulsion thereby, means for connecting the reaction rotor to a rotationally stationary portion of the mechanism, and means for connecting said reaction rotor to the driven shaft, said means operating automatically in accordance with speed or torque conditions to control the operation of the reaction rotor.

2. In a power transmission mechanism of the gear and fluid turbine type, a fluid impeller rotor, a fluid runner rotor, a reaction rotor for directing circulating fluid from the runner rotor back to the impeller rotor, a driving member carrying a driving gear, spider gears driven by said driving gear, a gear connected to the impeller rotor and driven by said spider gears, a spider cage rotatably carrying said spider gears, a driven shaft connected to the spider cage and to the runner rotor for joint propulsion thereby, means for connecting the reaction rotor to a rotationally stationary portion of the mechanism, and means for connecting said reaction rotor to the driven shaft, said means controlling the operation of the reaction member in accordance with speed or torque conditions.

3. In a power transmission mechanism of the gear and fluid turbine type, a fluid impeller rotor, a fluid runner rotor, a reaction rotor for directing circulating fluid from the runner rotor back to the impeller rotor, a driving member carrying a driving gear, spider gears driven by said driving gear, a gear connected to the impeller rotor and driven by said spider gears, a spider cage rotatably carrying said spider gears, a driven shaft connected to the spider cage and to the runner rotor for joint propulsion thereby, brake means for connecting the reaction rotor to a rotationally stationary portion of the mechanism, and clutch means for connecting said reaction rotor to the driven shaft, said brake and clutch means automatically controlling the operation of the reaction member in accordance with speed or torque conditions of the mechanism.

4. In a power transmission mechanism of the gear and fluid turbine type, a fluid impeller rotor, a fluid runner rotor, a reaction rotor for directing circulating fluid from the runner rotor back to the impeller rotor, a driving member carrying a driving gear, spider gears driven by said driving gear, a gear connected to the impeller rotor and driven by said spider gears, a spider cage rotatably carrying said spider gears, a driven shaft connected to the spider cage and to the runner rotor for joint propulsion thereby, means for connecting the reaction rotor to a rotationally stationary portion of the mechanism during periods of relatively high torque transmission, and means for connecting said reaction rotor to the driven shaft during periods of relatively low torque transmission.

5. In a power transmission mechanism of the gear and fluid turbine type, a fluid impeller rotor, a fluid runner rotor, a reaction rotor for directing circulating fluid from the runner rotor back to the impeller rotor, a driving member, gearing connecting said driving member and impeller rotor, a driven shaft connected to the runner rotor and an element of the gearing for joint propulsion thereby, means for connecting the reaction rotor to a rotationally stationary portion of the mechanism during periods of relatively high torque transmission, and means for connecting said reaction rotor to the driven shaft during periods of relatively low torque transmission.

6. In a power transmission mechanism of the gear and fluid turbine type, a fluid impeller rotor, a fluid runner rotor, a reaction rotor for directing circulating fluid from the runner rotor back to the impeller rotor, a driving member, gearing connecting said driving member and impeller rotor, a driven shaft connected to the runner rotor and an element of the gearing for joint propulsion thereby, means for connecting the reaction rotor to a rotationally stationary portion of the mechanism during periods of relatively high torque transmission, and means for connecting said reaction rotor to the driven shaft during periods of relatively low torque transmission, said gearing being arranged in such a manner that the reaction forces are transmitted directly to the driven shaft at all times and in the direction of its rotation.

7. In a power transmission mechanism of the gear and fluid turbine type, a fluid impeller rotor, a fluid runner rotor, a reaction rotor for directing circulating fluid from the runner rotor back to the impeller rotor, a driving member, gearing connecting said driving member and impeller rotor, a driven shaft connected to the runner rotor and an element of the gearing for joint propulsion thereby, said reaction rotor being mounted for at least a slight rotational movement in either direction, and means for positively controlling the rotation of said reaction rotor in said either direction to prevent free running thereof.

8. In a power transmission mechanism of the gear and fluid turbine type, a fluid impeller rotor, a fluid runner rotor, a reaction rotor for directing circulating fluid from the runner rotor back to the impeller rotor, a driving member, gearing connecting said driving member and impeller rotor, a driven shaft connected to the runner rotor and an element of the gearing for joint propulsion thereby, means for holding said reaction rotor rotationally stationary with respect to the mechanism under certain conditions of operation, and means maintaining rotation of the reaction rotor at a speed not greater than the speed of the runner rotor under certain other conditions of operation and to prevent the latter overrunning the former.

9. In a power transmission mechanism of the gear and fluid turbine type, a fluid impeller rotor, a fluid runner rotor, a reaction rotor for directing circulating fluid from the runner rotor back to the impeller rotor, a driving member, gearing connecting said driving member and impeller rotor together and for driving the rotor at a speed higher than the speed of the driving member, a driven shaft connected to the runner rotor and an element of the gearing for joint propulsion thereby, means for connecting the reaction rotor to a rotationally stationary portion of the mechanism during periods when the impeller rotor speed is substantially greater than that of the driving member, and means for connecting said reaction rotor to the driven shaft during periods when the impeller speed is substantially equal to that of the driving member.

10. A power transmission mechanism of the gear and fluid drive type including a fluid turbine and comprising in part, a stationary housing, a fluid impeller rotor, a fluid runner rotor, said rotors being connected to the gear portion of the transmission, a reaction rotor for directing fluid from the runner back to the impeller rotor, means locking said reaction rotor to the stationary housing under certain conditions of operation of the mechanism, and additional means locking said reaction rotor to the runner rotor under certain other conditions of operation.

11. A power transmission mechanism of the gear and fluid drive type including a fluid turbine and comprising in part, a stationary housing, a fluid, impeller rotor, a fluid runner rotor, means connecting said rotors to the gear portion of the transmission, a reaction rotor for directing fluid from the runner back to the impeller rotor, means locking said reaction rotor to the stationary housing under certain conditions of operation of the mechanism, and additional means locking said reaction rotor to the runner rotor under certain other conditions of operation, said means and additional means consisting of automatically operating one-way brake and clutch devices respectively.

12. A power transmission mechanism of the mechanical and fluid drive type including a fluid turbine and comprising in part, a stationary housing, a driving member, a fluid impeller rotor operatively connected to the driving member for rotation thereby, a driven member, said operative connection including torque modifying means, a fluid runner rotor connected to said driven member to propel the same, a reaction rotor for directing fluid from the runner back to the impeller rotor, means connecting the reaction rotor to said stationary housing under certain conditions of operation, and means for connecting said reaction rotor to the driven member during certain other conditions of operation.

13. A power transmission mechanism of the mechanical and fluid drive type including a fluid turbine and comprising in part, a stationary housing, a driving member, a fluid impeller rotor operatively connected to the driving member for rotation thereby, a driven member, said operative connection including torque modifying means, a fluid runner rotor connected to said driven member to propel the same, a reaction rotor for directing fluid from the runner back to the impeller rotor, means connecting the reaction rotor to said stationary housing under certain conditions of operation, and means for connecting said reaction rotor to the driven member during certain other conditions of operation, said means consisting respectively of an automatically operating one-way brake and clutch.

14. A power transmission mechanism of the mechanical and fluid drive type including a fluid turbine and comprising in part, a fluid impeller rotor operatively connected to the driving portion of the transmission, a fluid runner rotor connected to the driven portion of the transmission, a reaction rotor for directing circulating fluid from the runner back to the impeller rotor, said impeller and runner rotors moving relative to the reaction rotor under certain conditions of operation, and said runner and reaction rotors moving in unison relative to the impeller rotor under certain other conditions of operation, said unity of movement being maintained by automatically operating clutch means locking the reaction rotor to the runner rotor and driven portion of the transmission under said certain other conditions of operation.

LEVI M. DE TURK.